United States Patent

[11] 3,618,647

[72] Inventor Virgil C. Stuart, Jr.
West Palm Beach, Fla.
[21] Appl. No. 877,937
[22] Filed Nov. 19, 1969
[45] Patented Nov. 9, 1971
[73] Assignee Owens-Illinois, Inc.

[54] TREE HARVESTER
5 Claims, 4 Drawing Figs.

[52] U.S. Cl. .................................................. 144/309 AC,
144/2 Z, 144/3 D
[51] Int. Cl. ...................................................... A01g 23/02
[50] Field of Search .......................................... 144/2 Z, 3
D, 34 R, 34 E, 309 AC

[56] References Cited
UNITED STATES PATENTS

| | | | |
|---|---|---|---|
| 3,385,333 | 5/1968 | Eynon | 144/3 D |
| 3,487,864 | 1/1970 | Larson et al. | 144/3 D |
| 3,531,235 | 9/1970 | Boyd et al. | 144/2 Z |

FOREIGN PATENTS

| | | | |
|---|---|---|---|
| 119,034 | 4/1958 | U.S.S.R. | 144/3 D |

*Primary Examiner*—Gerald A. Dost
*Attorneys*—E. J. Holler and Alan J. Steger

ABSTRACT: A novel and improved tree-harvesting method and apparatus adapted to cut, delimb, top, transport and deposit a plurality of trees in a stack at a desired collection point. The tree harvester features a horizontally oriented mast which is mounted on a mobile vehicle. A butt shear and felling grapple are pivotally mounted at one end of the mast and are adapted to grasp and sever a standing tree and pivot it to a substantially horizontal position overlying the mast where it is grasped and securely held by a transfer grapple. A combination delimber and top shear is mounted for longitudinal movement on the top of the mast and is adapted to be driven along the tree to strip all limbs from the tree and also to remove the top portion of the tree at either a predetermined length or diameter. After the tree has been delimbed and topped, it is dropped by the transfer grapple into collection arms positioned at intervals along the mast and adapted to hold a large number of delimbed and topped trees to be transported by the tree harvester to a collection point where the trees are deposited in a stack.

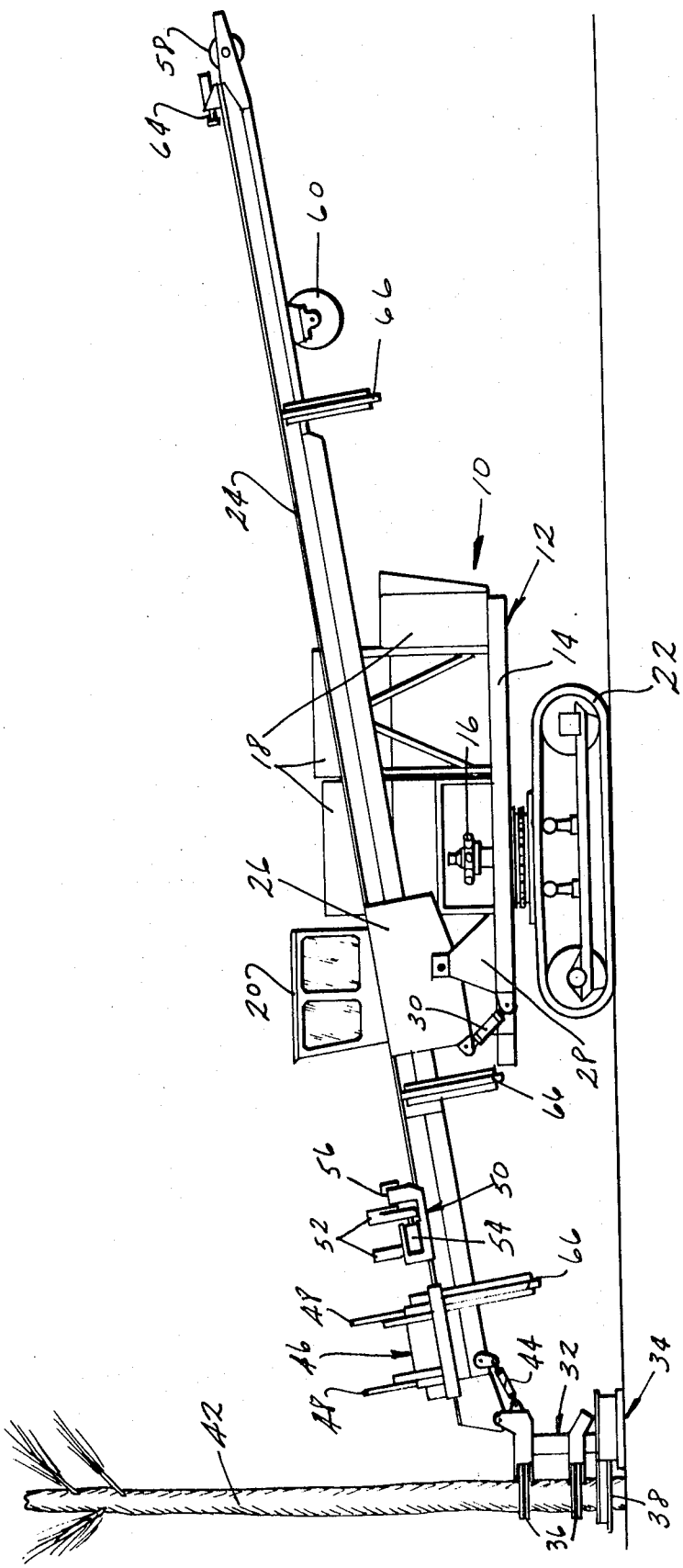

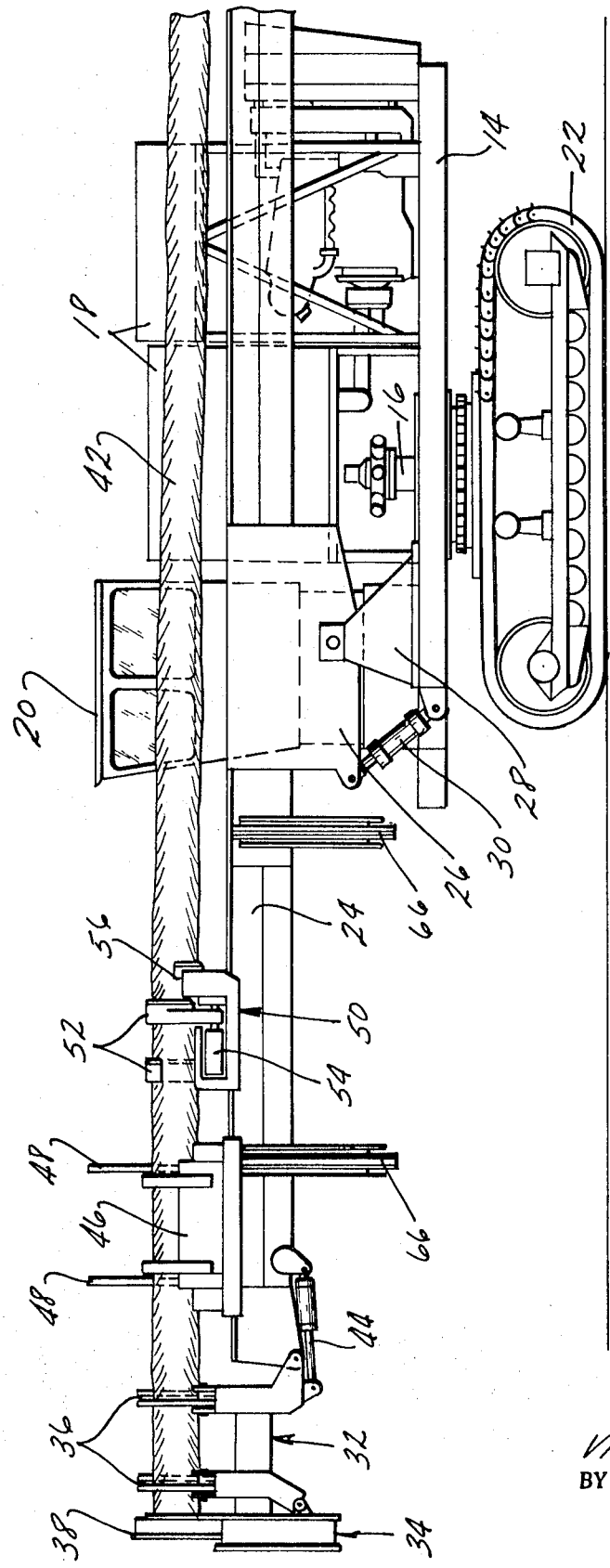

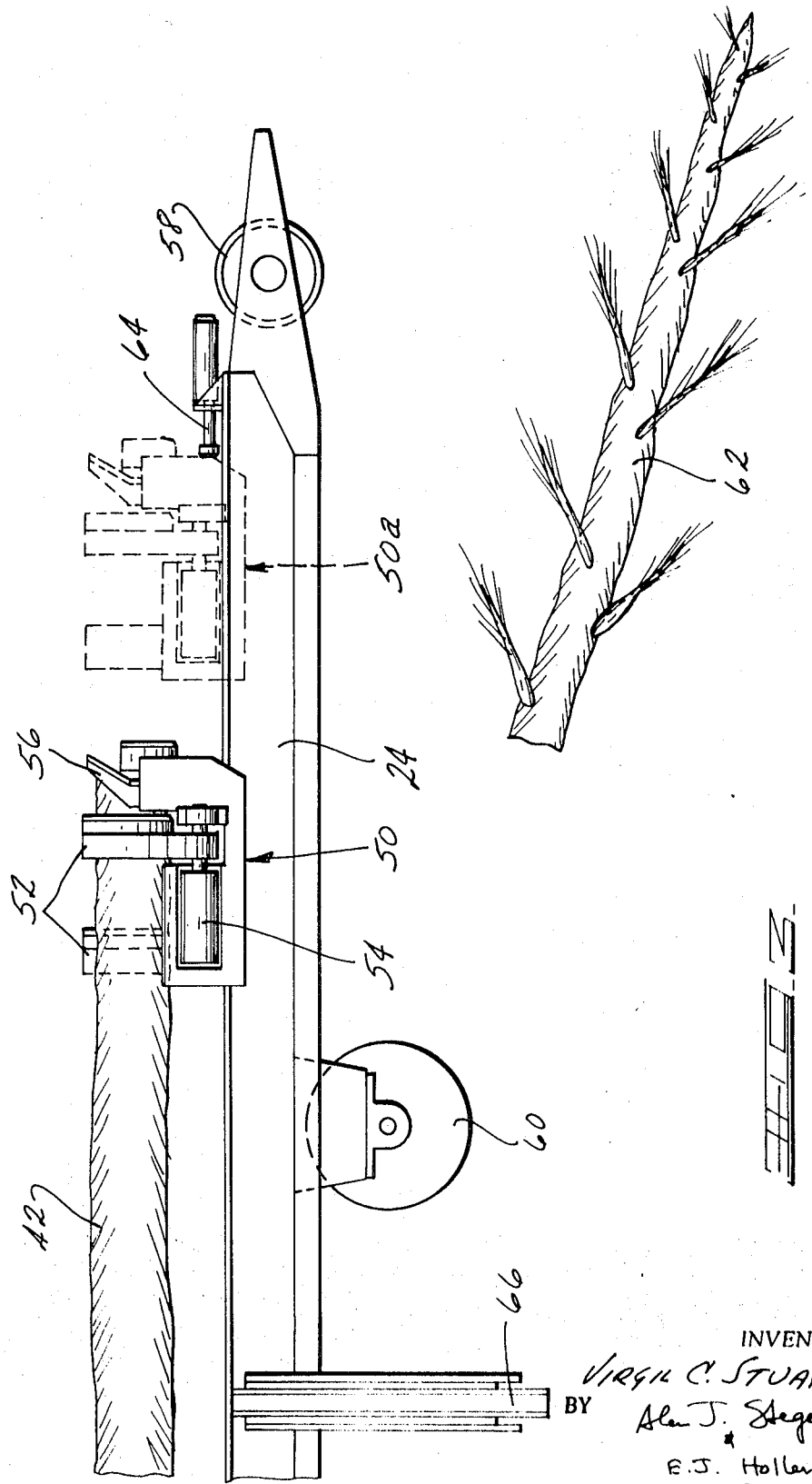

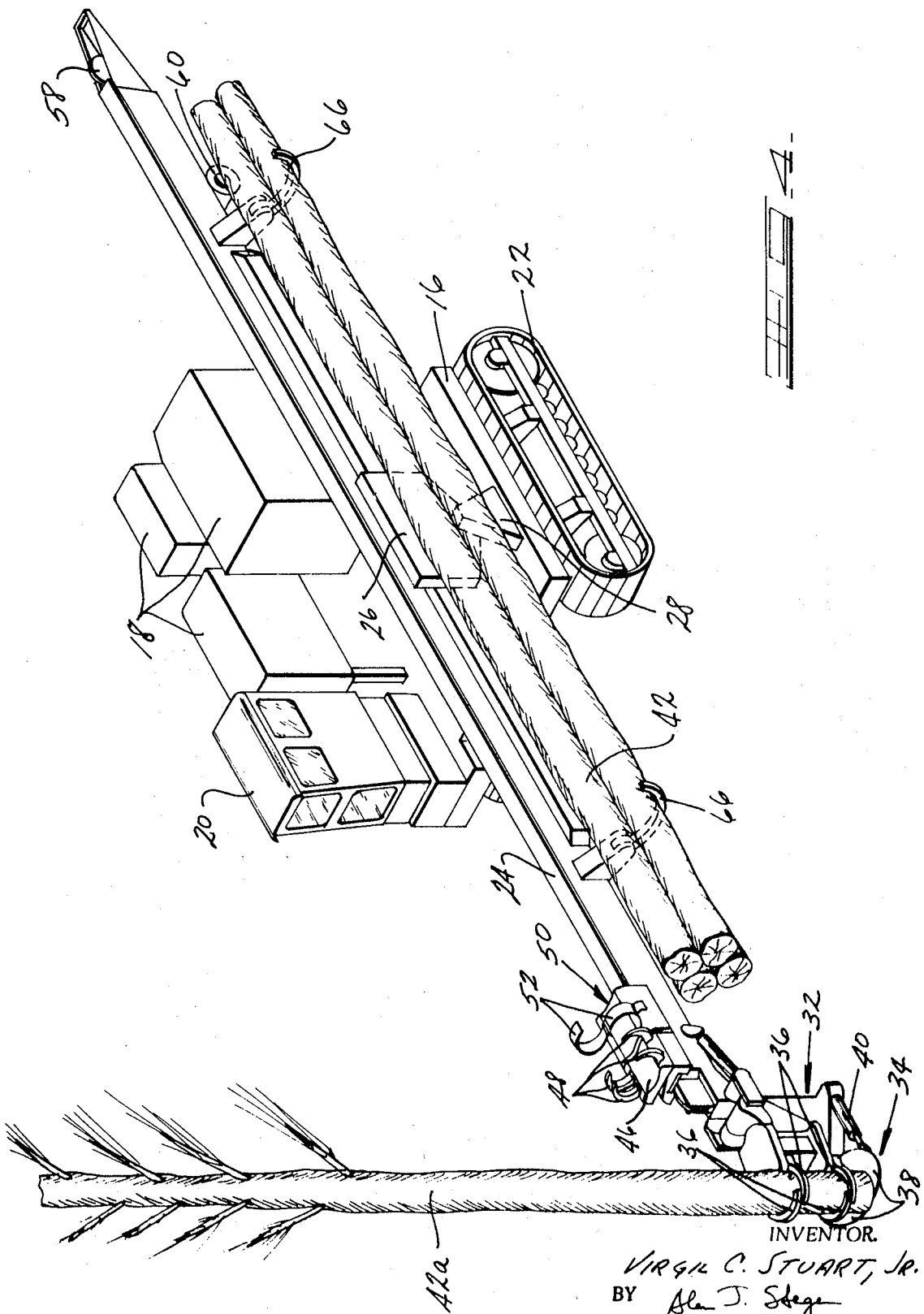

TREE HARVESTER

BACKGROUND OF THE INVENTION

This invention relates to a novel method and apparatus for harvesting and processing trees.

Historically, trees have been harvested by methods requiring various sequences of operations and the use of a number of different tools, tractors, horses, saws, skidders, trucks, cranes and the like. More specifically, trees have been felled by using handsaws manually, manipulated power saws, axes, wedges and guide ropes. These procedures obviously require a considerable amount of manual labor. In order to reduce the amount and cost of the manual labor various machines have been proposed heretofore for felling trees, but such machines have not been found to be sufficiently practical for harvesting trees from a forest.

It is, therefore, an object of this invention to provide a novel tree-harvesting machine which completely processes a tree and overcomes the disadvantages associated with previously known tree-harvesting machinery.

SUMMARY OF THE INVENTION

This invention provides a unique tree-harvesting machine which will cut, delimb, top, transport and deposit a plurality of trees in a stack at a desired collection point.

In general, the tree-harvesting machine of this invention features a substantially horizontally extending mast which is mounted on a mobile vehicle. A butt shear and felling grapple are pivotally mounted at one end of the mast and are adapted to grasp and sever a standing tree and pivot it to a substantially horizontal position overlying the mast. A transfer grapple is mounted on the mast at the same end as the butt shear and felling grapple and is adapted to receive and securely hold the tree after it has been laid down by the felling grapple. The novel tree harvester of this invention further includes a combination delimber and top shear which is mounted for longitudinal movement on the top of the horizontal mast and is adapted to be driven along the tree to strip all limbs from the tree and to remove the top portion of the tree at either a predetermined length or predetermined diameter. A plurality of tree collection arms are attached to one side of the horizontal mast and are adapted to receive a large number of delimbed and topped trees to be transported by the tree harvester to a collection point where the trees can be dropped in a bundle.

Other objects, features and advantages of this invention will become obvious upon reference to the following detailed description of the invention and the drawings illustrating the preferred embodiment thereof.

IN THE DRAWINGS

FIG. 1 is a side elevational view of the tree harvester of this invention as it initially grasps and severs a standing tree at ground level.

FIG. 2 is an enlarged view of a portion of the tree harvester of FIG. 1 after it has pivoted a tree to a substantially horizontal position for processing.

FIG. 3 is an enlarged view of another portion of the tree harvester of FIG. 1 after it has delimbed and topped a tree.

FIG. 4 is a perspective view of the tree harvester of this invention holding several processed trees for transport with the harvester and grasping a new standing tree to be processed.

DETAILED DESCRIPTION OF THE INVENTION

A novel and improved tree harvester is shown in FIGS. 1 through 4 and is indicated generally by the numeral 10. A mobile vehicle supporting and powering the tree-harvesting apparatus of this invention is indicated generally by the numeral 12 and may comprise any mobile vehicle such as a crawler tractor having a swingable base platform 14, base platform swing mechanism 16, powerplant units 18, operator cab 20, and endless treads 22. The mobile vehicle 12 may be of any suitable type which is adapted to support the tree harvester apparatus and convey it into a forest-type area. In addition, the powerplant units 18 may be of any standard type suitable to propel the vehicle 12 and to provide power for operating the various tree-harvesting apparatus which will be hereinafter described.

The main structural component of the tree-harvesting apparatus is a mast 24 which is telescopingly mounted in a generally horizontal position within a mast collar 26. The mast collar 26 is pivotally mounted above and supported on the base platform 14 by means of a mounting flange 28. A hydraulic actuating mechanism 30 is mounted between the base platform 14 and the mast collar 26 to control the vertical position of the mast 24. The mast 24 is adapted for linear movement relative to the mast collar 26 and driven by means not shown. Thus, it should be understood that the position of the mast 24 may be controlled both to move the mast into and away from the mobile power unit 12 and also to change the angle of the mast 24 with respect to the horizon.

Pivotally mounted at one end of the mast 24 is a felling grapple unit 32 (which can best be seen in FIG. 4) which includes a butt shear mechanism 34 and four grasping arms 36. The butt shear 34 includes a pair of shearing blades 38 each of which are actuated for movement relative to the felling grapple unit 32 by means of a hydraulic cylinder 40 (only one is visible in FIG. 4). The blades 38 are adapted to completely sever the trunk of a tree when actuated by the cylinders 40. The four grasping arms 36 securely hold and position the trunk of a tree while the cutting blades 38 of the butt shear 34 sever the tree at a location close to ground level. The felling grapple unit 32 is actuatable to pivot 90° relative to the mast 24 by means of a hydraulic cylinder 44. Thus, once the butt shear 34 has severed a tree (such as the large standing tree 42 in FIG. 1) the cylinder 44 is actuated to pivot the felling grapple unit 32 and the tree 42 to the position shown in FIG. 2.

Fixed to the top of the mast 24 at the same end as the felling grapple unit 32 is a transfer grapple unit 46. The transfer grapple unit 46 includes four grasping arms 48 which are very similar to the grasping arms 36 on the felling grapple unit 32. It is the function of the grasping arms 48 on the transfer grapple 46 to securely hold and position the tree in an overlying position with respect to the mast 24 while the delimbing and topping functions are performed by apparatus to be described hereinafter. When the tree 42 has been pivoted by means of the felling grapple unit 32 to the position shown in FIG. 2, the grasping arms 48 of the transfer grapple 46 are closed to grasp and securely hold the tree 42. At this time the arms 36 may be opened and the felling grapple unit 32 pivoted downwardly 90° to the position shown in FIG. 4 in preparation for grasping and severing another tree 42a.

A combination delimber and top shear unit 50 is mounted on and adapted for movement along the length of mast 24. This delimber unit 50 includes a pair of delimbing blades 52 which are spring biased into circumferential engagement with the tree. The delimbing blades 52 are adapted to strip branches from the tree 42 as the delimber unit 50 is moved axially along the tree. Actuating means 54 are provided to open the delimbing blades 52 to the position shown in FIG. 4 prior to the acceptance of another tree. Further included in the delimber unit 50 is a top shear device 56 which comprises a pair of knife edge blades which are actuatable to shear through the tree trunk to thereby remove the top portion 62 of the tree 42. The top shear device 56 is adapted to be automatically actuated at either a predetermined length of the tree trunk or at a predetermined diameter. For example, if it is desired to have all trees cut to a predetermined length of 50 feet, the top shear mechanism 56 can be set to automatically sheer off the top of the tree when it reaches a 50-foot length as it passes along the tree; or, if it is desired to have no portion of the resulting tree trunk with a diameter of less than 3 inches, the top shear may be set to sense a diameter of 3 inches and automatically shear off the top of the tree at that point.

The operation of the delimber unit 50 can best be understood when viewing the transition from FIG. 2 to FIG. 3. In FIG. 2, it can be seen that the delimbing blades 52 close around the tree 42 once it is firmly held by the grasping arms 48. At this point, the cutting knives of the top shear device 56 remain open. The delimber unit 50 then proceeds along the mast 24 delimbing the tree 42 as it proceeds. The delimber unit 50 is propelled on a cable (not shown) which is driven around a pulley 58 by means of a delimber cable drive mechanism 60. Once delimber unit 50 reaches the position shown in FIG. 3, the top shear 56 is actuated to shear off the top portion 62 of the tree 42. The delimber unit 50 then moves on to the position shown in phantom lines 50a where it contacts a hydraulic shock absorber 64 which actuates the delimber cable drive mechanism 60 to reverse the direction of the delimber unit 50 to return it to a position adjacent to the transfer grapple 46 as shown in FIG. 4. In the meantime, after the tree has been topped and delimber unit 50 has moved past the tree to the position shown in phantom lines 50a in FIG. 3, the grasping arms 48 are opened to release the tree 42. The tree 42 is then dropped into a plurality of collection arms 66 which are positioned at intervals along the mast 24 and adapted to accumulate and hold for transport with the tree harvester 10 a considerable number of processed trees. The collection arms 66 are also adapted to be pivoted downwardly to simultaneously drop a bundle of processed trees at a predetermined collection point.

Thus, the tree-harvesting concept of this invention provides a tree-harvesting machine which is capable of completely processing a plurality of trees and delivering them as a group to a predetermined collection point. Once the operator has directed the equipment to a given tree such that it has been grasped by the felling grapple unit 32 and severed by the butt shear device 34, the tree is then automatically pivoted to a substantially horizontal position where it is grasped and held above the mast 24 by the grasping arms 48 on the transfer grapple 46. The delimber blades 52 are then closed into contact with the tree 42 and the delimber unit 50 is driven along the mast 24 and to remove all limbs from the tree 42. Once the delimber unit 50 reaches either a predetermined length or a predetermined diameter, as described previously, the top shear 56 removes the top 62 of the tree 42. The delimber unit 50 is then moved past the tree and the tree is released by the arms 48 and dropped into the collection arms 66. It should be noted that as soon as the tree is grasped and held by the arms 48 on the transfer grapple 46, the felling grapple unit 32 is rotated back to the position shown in FIG. 4, and the operator may proceed to adjust the position of the mast 24 so that the felling grapple unit 32 is positioned to grab a second tree 42a while the first tree 42 is being delimbed and topped. As soon as the first tree 42 has been released by the holding arms 48 into the collection arms 66, the second tree 42a may be sheared by the butt shear 34 and pivoted into position to be held by the arms 48 for delimbing and topping. Thus, while one tree is being processed the operator may position the equipment to grasp and shear the next tree so that the harvesting process becomes a continuous one.

Therefore, it should be clear that a continuous tree harvester is provided by this invention which is adapted to completely process trees in an extremely fast and economical manner. Previously, such tree harvesters have been adapted to sever and delimb only one tree at a time prior to approaching a second tree. In addition, they were not equipped to stack and carry a number of processed trees for dumping in a bundle at a predetermined collection point. In other words, previous such harvesters would process one tree at a time and drop it individually on the ground for collection at a later time. This, therefore, required the use of a separate tree-gathering machine. In contrast to this, the novel tree harvester of this invention is capable of collecting on the machinery a plurality of trees for transport with the machine and then dumping them in a group at a predetermined collection point. Thus, this self-transporting feature of the subject invention eliminates the need for a tree collection machine to be used for collecting individual trees deposited randomly throughout the forest.

The harvester of this invention is completely mobile in that it is supported on and powered by a tractor-type vehicle which is adapted for travel over the rough terrain that is usually encountered in and around a forest. Also, because of the maneuverability of its horizontal mast the tree harvester of this invention is capable of reaching and processing a number of trees without changing the position of the main tractor support unit.

Additionally, the novel tree harvester of the subject invention required the labor of only one operator to cut, delimb, top and transport a group of trees for dumping in a stack at a collection point. In contrast to this, previously known procedures would require several pieces of equipment and several operators to accomplish the same result. Thus, with the tree-harvesting apparatus and method of this invention considerable expense is saved both in machinery and labor over previously known tree-harvesting methods.

What is claimed is:

1. Tree-harvesting apparatus comprising, in combination:
    a mobile vehicle;
    mast means mounted on said mobile vehicle and oriented in a substantially horizontal direction;
    felling grapple means pivotally mounted at one end of said horizontal mast means for grasping, severing, and pivoting a standing tree to a substantially horizontal position overlying said horizontal mast means;
    transfer grapple means fixed to said horizontal mast means adjacent said felling grapple means for receiving a tree from said felling grapple means and for securely holding the tree in a fixed substantially horizontal position overlying said horizontal mast means;
    delimbing and topping means mounted for axial movement in the horizontal direction on said horizontal mast means along the length of said tree for stripping all branches from said tree and for removing the top of the tree; and
    collection means attached to said horizontal mast means for receiving and storing in a horizontal orientation a number of delimbed and topped trees to be transported with said tree-harvesting apparatus.

2. Tree-harvesting apparatus as set forth in claim 1 wherein said delimbing and topping means includes a pair of delimber blades movable into and out of engagement with the tree held by said transfer grapple means to remove all branches as the delimber blades are driven along said tree and a pair of top shear knives actuatable to remove the top portion of said tree.

3. Tree-harvesting apparatus as set forth in claim 2 further including a drive mechanism mounted on said horizontal mast means to drive said delimbing and topping means along said horizontal mast means.

4. The method of harvesting trees comprising the steps of grasping a standing tree, severing the tree at a point near its base, pivoting the severed tree to a substantially horizontal orientation, supporting said tree in a fixed elevated position while maintaining its substantially horizontal orientation, delimbing said tree by passing a delimbing mechanism along the length of said tree while supporting said tree in said fixed substantially horizontal position, topping said tree while it is supported in said substantially horizontal position, and storing said tree along with other delimbed and topped trees in an elevated and substantially horizontal position.

5. The method of claim 4 further including the step of releasing said stored trees to thereby deposit said trees in a stack.

* * * * *